(12) United States Patent  
Kasprzak et al.

(10) Patent No.: US 8,065,539 B2
(45) Date of Patent: Nov. 22, 2011

(54) SYSTEM AND METHOD FOR ADJUSTING INFORMATION HANDLING SYSTEM OVER CURRENT PROTECTION WITH A COMMON POWER CABLE

(75) Inventors: Keith Kasprzak, Cedar Park, TX (US); Daniel Little, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 481 days.

(21) Appl. No.: 12/260,542

(22) Filed: Oct. 29, 2008

(65) Prior Publication Data

US 2010/0106983 A1    Apr. 29, 2010

(51) Int. Cl.
G06F 1/00 (2006.01)
G06F 1/26 (2006.01)

(52) U.S. Cl. ........................................................ 713/300
(58) Field of Classification Search ................... 713/300, 713/320
See application file for complete search history.

(56) References Cited

U.S. PATENT DOCUMENTS

| 7,149,098 | B1 | 12/2006 | Chen |
| 7,224,154 | B2 | 5/2007 | Kasprzak et al. |
| 7,613,939 | B2 * | 11/2009 | Karam et al. ................. 713/300 |
| 2009/0031152 | A1 * | 1/2009 | Bolderl-Ermel et al. ..... 713/300 |

* cited by examiner

*Primary Examiner* — Mohammed Rehman
(74) *Attorney, Agent, or Firm* — Hamilton & Terrile, LLP; Robert W. Holland

(57) ABSTRACT

An AC-to-DC adapter provides power to information handling systems at different power levels based on the power rating of the information handling system. An adapter manager sets a first lower level at an over current protection circuit unless the information handling system sends identification information that indicates the information handling system is rated to accept a second higher power level, such as by sending a low signal pulse through a serial communication line. While the identification information is present and external power is applied to the adapter, the adapter manager sets a second higher level at an over current protection circuit to allow output of a second higher power level.

20 Claims, 3 Drawing Sheets

SYSTEM AND METHOD FOR ADJUSTING INFORMATION HANDLING SYSTEM OVER CURRENT PROTECTION WITH A COMMON POWER CABLE

BACKGROUND OF THE INVENTION

1. Field of the Invention

The present invention relates in general to the field of information handling system power subsystems, and more particularly to a system and method for adjusting information handling system over current protection.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many of the components used to process information in an information handling system operate on direct current (DC). To power DC components, information handling systems typically have an AC-to-DC power adapter that converts alternating current (AC) provided from an external source, such as a wall socket, into direct current. Desktop or tower information handling systems typically integrate the AC-to-DC adapter into the system housing. Integrated AC-to-DC adapters are generally designed to meet the power needs of the information handling system based upon the expected amount of power that the system will draw. Typically, a number of safeguards, such as over current protection circuits, are disposed in the power subsystem to ensure that the information handling systems will not draw more power than the adapter is designed to provide.

Portable information handling systems also have components that run on DC power, however, portable information handling systems typically do not integrate an AC-to-DC adapter into their housings. Instead, portable information handling systems usually have an external AC-to-DC power adapter that is separate from the system housing. Using an external power adapter improves system portability by eliminating the external power source from the system housing when the system operates on internal battery power. Portable information handling system AC-to-DC adapters have a plug that inserts into AC electrical sockets to accept external power and a second plug that inserts into a DC socket of the information handling system housing to provide DC power to the information handling system. Portable information handling system AC-to-DC adapters provide a range of power outputs that depend upon the power consumption of the system supported by the adapter. For instance, typical AC-to-DC adapter power outputs vary from less than 60 Watts to greater than 240 Watts.

One difficulty with the use of an AC-to-DC adapter that is separate from an information handling system housing is that an end user may attempt to power a portable information handling system with an inappropriate adapter. If an adapter's power output is less than the power required for the information handling system, the information handling system will likely run but have degraded performance. If an adapter's output is greater than the power required for the information handling system, a danger exists that an over current condition might occur, causing damage to the information handling system or injury to an end user. To avoid the use of an incompatible adapter and information handling system, a variety of different adapter plug configurations are used for adapters of different power outputs. For example, an adapter that outputs greater than 240 Watts of power has a plug that will not fit into an information handling system that is not configured to accept that much power. Although this prevents the use of incompatible adapters and information handling systems, it also promotes the use of a wide array of adapter plugs that increase the cost of adapters and tend to confuse end users.

SUMMARY OF THE INVENTION

Therefore a need has arisen for a system and method which adjusts information handling system over current protection so that a common adapter will output different power levels to different information handling systems.

In accordance with the present invention, a system and method are provided which substantially reduce the disadvantages and problems associated with previous methods and systems for providing power from an AC-to-DC power adapter to information handling systems at plural power levels. The adapter defaults to a low power output associated with a first device type unless the device communicates identification information, such as a low signal pulse signal, that indicates the device can accept a higher power output. The higher power output is provided to the device by changing the set point of an over current protection circuit at the adapter to allow a higher power output.

More specifically, an information handling system is built with plural processing components disposed in a housing. The processing components operate with direct current power provided by a power subsystem. The power subsystem accepts power from an AC-to-DC power adapter, which converts AC power to DC power used by the electronic processing components. The AC-to-DC adapter has an adapter manager that selectively outputs a high or low power level based upon the model type. Upon initial power up from an external AC power source and initial connection with an information handling system, the adapter manager sets an over current protection circuit so that the adapter outputs a maximum of a first low power setting associated with a first information handling system model type. If the adapter manager detects an identification signal from the information handling system associated with a second higher power information handling system model type, the adapter manager resets the over current protection circuit to allow a maximum of a second higher power level. For example, the information handling system indicates compatibility with a high power output by sending a low signal pulse to the adapter through a PSID serial link. Once the adapter disconnects from the information handling system, the adapter reverts to the lower power output by resetting the over current protection circuit to allow a maximum of the lower output.

The present invention provides a number of important technical advantages. One example of an important technical advantage is that a high power AC-to-DC power adapter may be used with information handling systems that have lower power ratings by adjusting an over current protection circuit output level in the power adapter based on the power rating of the information handling system. The adjustment of the over current protection circuit is supported by an analog circuit having a minimal cost. The use of a common adapter having over current protection adjustment for information handling systems having a variety of power ratings reduces the cost of designing and manufacturing power adapters by allowing a common plug for the information handling systems regardless of their power rating. For example, bulk purchase of power adapters reduces overall cost where the same power adapter is used for plural types of information handling systems. Further, end users face less confusion in selecting and using a power adapter for an information handling system since fewer types of plugs are needed.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling systems having different power ratings are powered by a common AC-to-DC power adapter by changing the set point of an over current protection circuit in the adapter to prevent the adapter from exceeding the power rating of the information handling system receiving power from the adapter. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
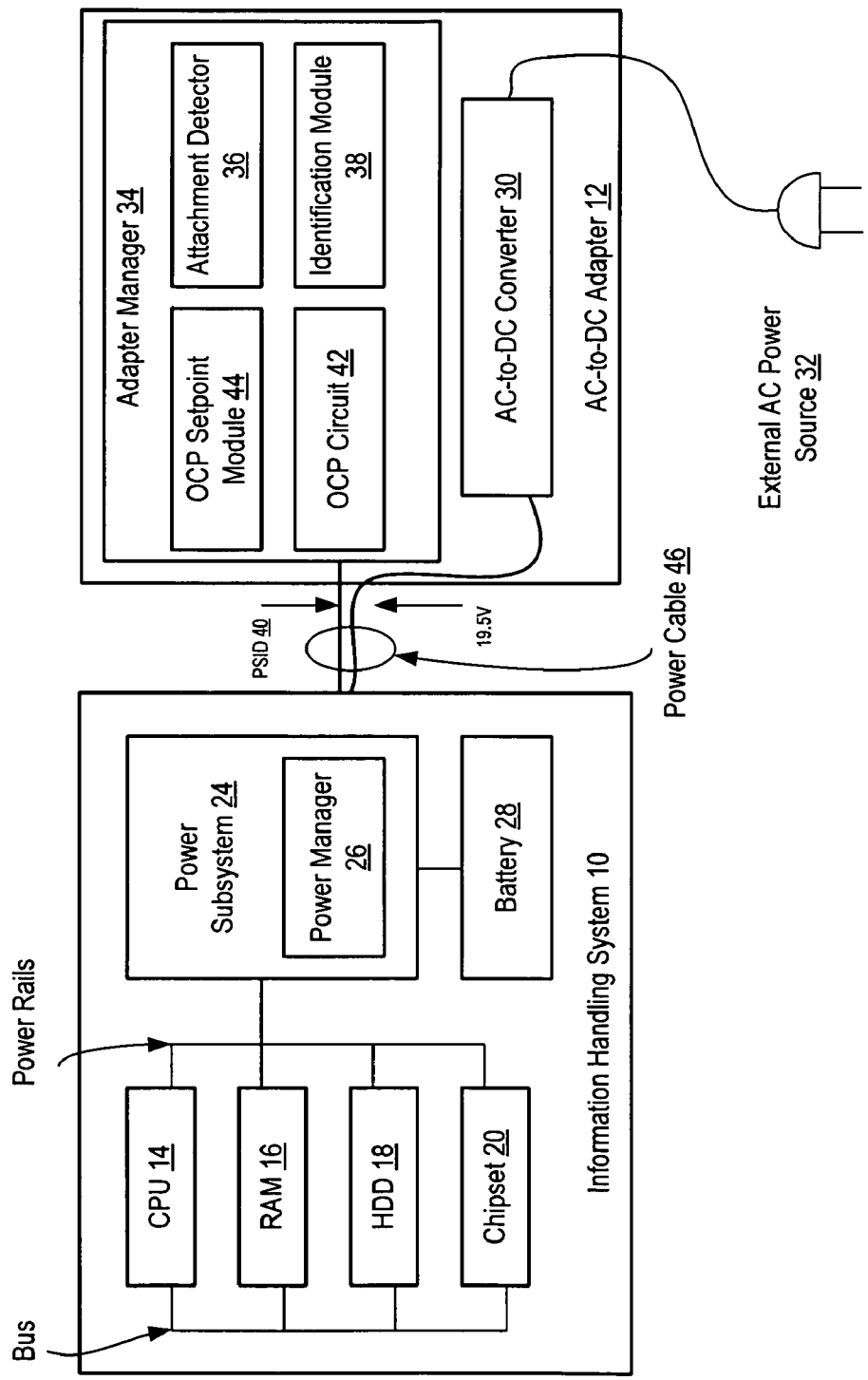
FIG. 1 depicts a block diagram of an information handling system and AC-to-DC adapter that provides power at plural power levels.

Referring now to FIG. 1, a block diagram depicts an information handling system 10 and AC-to-DC adapter 12 that provides power at plural power levels. Information handling system has plural processing components, such as a CPU 14, RAM 16, a hard disk drive 18 and a chipset 20, the processing components disposed in a housing 22 and cooperating to process information. The processing components are electrical components that operate on direct current (DC) power provided by a power subsystem 24, which is managed by a power manager 26. Power subsystem 24 receives power for operating the electrical components from either an internal battery 28 or from an AC-to-DC converter 30, which converts alternating current (AC) power received from an external AC power source 32.

AC-to-DC adapter 12 has an adapter manager 34 to manage the power provided from AC-to-DC converter 30 to power subsystem 24. An attachment detector 36 detects attachment of adapter 12 with information handling system 10 and an identification module 38 receives identification information from power manager 26 through a PSID line 40. PSID line 40 provides a serial communication link between power manager 26 and identification module 38 to verify that adapter 12 is compatible with information handling system 10. Adapter manager 34 applies the identification information to determine a power rating of information handling system 10 and then to limit power output from AC-to-DC converter 30 to the determined power rating. For example, an over current protection (OCP) circuit 42 has a variable set point that is set by an OCP set point module 44 so that not more than a maximum setting of current will pass through a power cable 46 to information handling system 10, thereby limiting power drawn by information handling system 10. For instance, two types of information handling system models are compatible with AC-to-DC adapter 12, with a first model type having a maximum power rating of 100 Watts and a second model type having a maximum power rating of 240 Watts. Adapter manager 34 sets the maximum power output at either 100 Watts or 240 Watts with OCP set point module 44 by setting a maximum direct current allowed by OCP circuit 42 based upon the identification of the model type provided from power manager 26 to identification module 38. In one embodiment, power manager 26 provides a low signal pulse signal to indicate compatibility with the higher power setting so that the higher power setting is automatically withdrawn if the continuous signal is withdrawn. For instance, the continuous signal is a low signal pulse sent through PSID serial link 40 and distinguished from serial link communications by the pulse timing using a timer in adapter manager 34.

Figure 2:
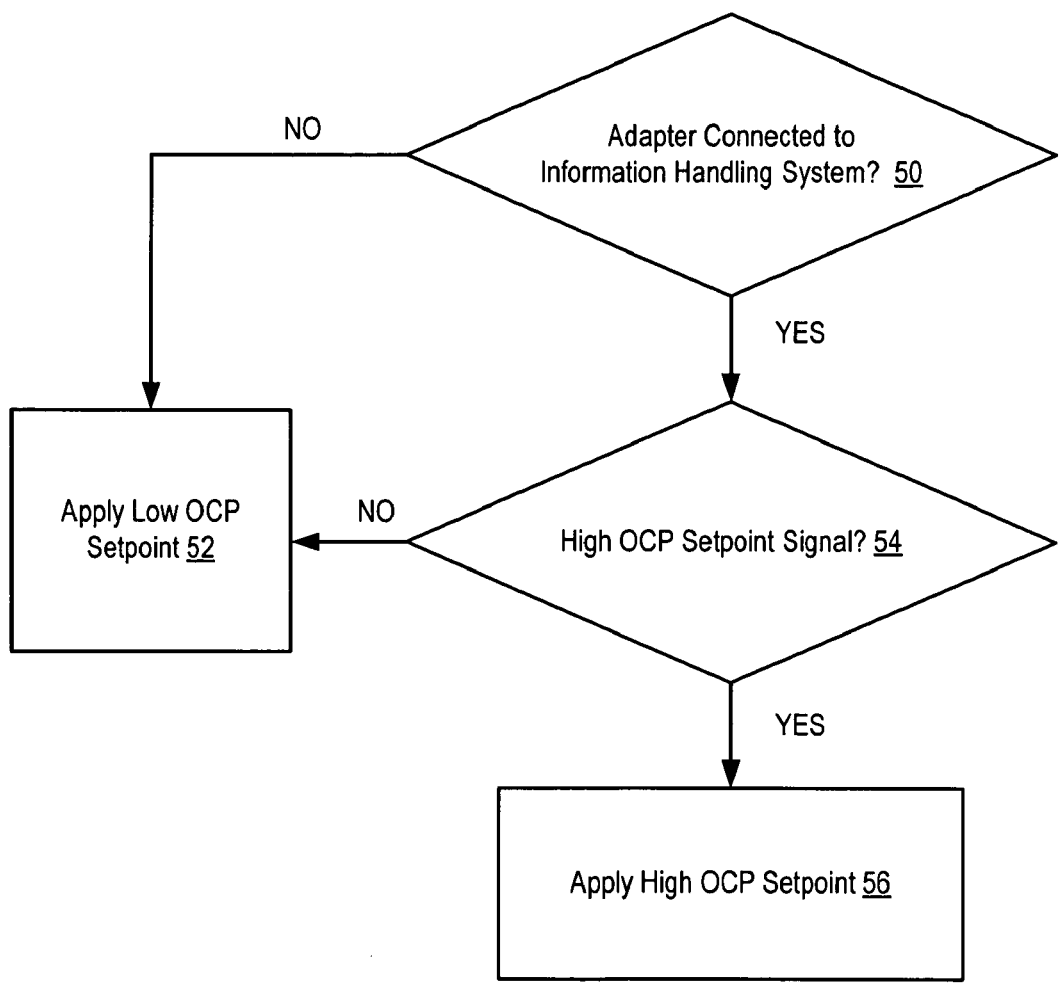
FIG. 2 depicts a flow diagram of a process for managing the power level of an AC-to-DC power adapter.

Referring now to FIG. 2, a flow diagram depicts a process for managing the power level of an AC-to-DC power adapter. The process begins at step 50 with power applied to the adapter from an external AC power source by determining whether the adapter is connected with an information handling system. If the adapter is not connector to an information handling system or is subsequently disconnected from the information handling system, the process continues to step 52 to apply the low over current protection set point so that the power adapter outputs no greater than a low power output. If connected to an information handling system at step 50, the process continues to step 54 to determine if a high over current protection signal is provided from the information handling system that receives power from the adapter. For example, the information handling system sends identification information that indicates that it operates at the high power output. If the information handling system fails to send an indication that it has a high power rating suitable to the high power output of the adapter, then the process continues to step 52 to apply the low over current protection set point. If the information handling system sends a high over current protection signal, such as identification information associated with a type of system having a high power rating compatible with the adapter high over current protection set point, the process continues to step 56 to apply the high over current protection set point.

Figure 3:
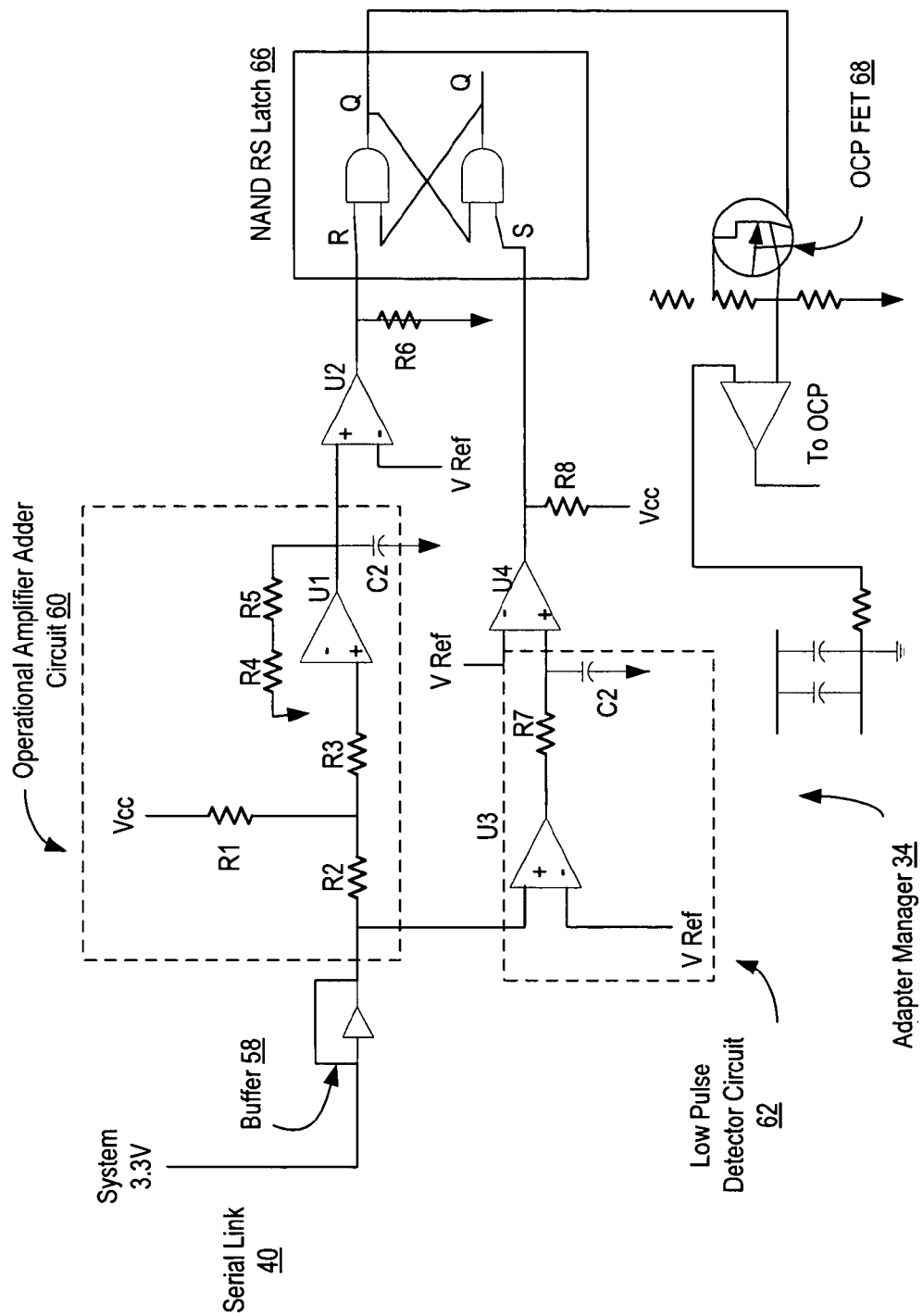
FIG. 3 depicts a circuit diagram of a system for managing the power level output by an AC-to-DC power adapter.

Referring now to FIG. 3, a circuit diagram depicts a system for managing the power level output by an AC-to-DC power adapter. Adapter manager 34 adjusts an over current protection from a low set point to a high set point when the adapter is plugged into the information handling system and the information handling system sends a long low pulse. A buffer 58 accepts signals sent from a device through serial link 40, such as PSID link, with buffer helping to avoid interference with normal serial signals sent down the link. After a signal arrives at buffer 58, the signal proceeds down one path to an operational amplifier adder circuit 60 and down another path to a low pulse detector circuit 62. Operational amplifier adder circuit 60 distinguishes whether the adapter is plugged into an information handling system. A capacitor C1 64 accepts the output from operational amplifier adder circuit 60 and filters normal serial communications and a low pulse from the information handling system to set the value R of a NAND RS latch 66. Low pulse detector circuit 62 detects a low pulse with a comparator detection circuit having a slight time delay. The output from low pulse detector circuit 62 sets the value S of NAND RS latch 66. The output of NAND RS latch 66 determines a setting Q of a crowbar circuit 68 according to the following truth table:

| R | S | Q |
|---|---|---|
| 0 | 1 | 0 |
| 1 | 0 | 1 |
| 1 | 1 | Remember Last State |

If Q has a value of 1, it turns on an FET that changes the OCP reference voltage set point.

In operation, when the AC-to-DC adapter is powered on, U1 operational amplifier in operational amplifier adder circuit 60 is pulled to a low state, which forces comparator U2 low, resulting in a value of R=0 in RS latch 66. A pull down resistor R6 helps to ensure that R starts with a low value at startup. At startup, the positive node of comparator U3 in low pulse detector 62 is pulled up through resistors R1 and R2 causing comparator U3 to have a high output. This forces comparator U4 high to lead to a value of S=1 at RS latch 66. Applying the RS latch truth table above, Q=0 at initial application of power to the adapter so that the adapter manager initiates with over current protection set at a low value. Q in RS latch 66 must equal 1 to turn on an FET switch that forces a high over current protection value.

If the AC-to-DC adapter is powered on when already plugged into an information handling system, the positive node of comparator U3 is pulled up thorough a PSID signal of serial link 40 causing a high output from comparator U3. The high value of comparator U3 also causes a high value at comparator U4 so that the value S of RS latch 66 is a high value of S=1. Upon initial application of external power to the adapter, resistor R6 ensures a low value of R for RS latch 66 at R=0 before the rest of the circuits of adapter manager 34 respond. As VCC comes up within adapter manager 34, operational amplifier U1 in operational amplifier adder circuit 60 is pulled high to force comparator U2 high so that R moves to a high value of R=1. With R having an initial value of R=0 and with S=0, movement of R to a high value of R=1 has the circuit remember its previous state so that Q remains set at Q=0. If the adapter is powered on first and then plugged into an information handling system, the circuit behaves similarly. As explained above, upon initial application of power to the adapter R=0, S=1 and Q=0. When the adapter is plugged into the information handling system, operational amplifier adder circuit 60 changes to a high output to force R=1, so that the circuit remembers its previous state and Q=0 remains the output.

The value of Q=1 to switch from a low over current protection setting to a high over current protection setting depends upon a low pulse signal sent from the information handling system through the PSID serial link 40. As set forth above, on initial power up R=1, S=1 and Q=0. If the information handling system has a power rating that accepts output from the adapter at a high over current protection setting, a low pulse is sent through serial link 40 and detected by comparator U3, which begins to discharge capacitor C2 low. Capacitor C2 and resistor R7 are sized to provide a desired delay time so that, after the desired delay time, capacitor C2 discharges enough to turn U4 output low and force S=0. Capacitor C1 in operational amplifier adder circuit 60 is sized so that the value of R is not altered from its present state by the low pulse signal sent through serial link 40. Thus, with S=0 and R=1, Q switches to a high value so that Q=1 to switch from the low over current protection value to a high over current protection value. Once the low pulse is received so that adapter manager 34 sets a high over current protection, unplugging the adapter from the information handling system results in adapter manager 34 switching back to the low over current protection value. When the adapter unplugs from the information handling system, comparators U3 and U4 outputs remain high so that S of RS latch 66 remains at the value S=1. However, operational amplifier adder U1 transfers to a low output to send R to a value of R=0, which forces a reset of RS latch 66 so that Q goes to a value of Q=0. At a value of Q=0, the over current protection FET 68 turns off to return the over current protection setting to a low value.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   plural electronic components disposed in the housing that cooperate to process information;
   a power subsystem disposed in the housing and operable to provide power to the electrical components;
   a power adapter separate from the housing and operable to convert power from alternating current to direct current and to provide the direct current power to the power subsystem through an external power cable;
   a power manager associated with the power subsystem and operable to communicate identification information to the power adapter through the external power cable;
   a power cable coupled to the power adapter and operable to couple to a provide power to a first power subsystem associated with a first power level and a second power subsystem associated with a second power level;
   an over current protection circuit associated with the power adapter and operable to limit power output from the power adapter to a high power level or a low power level; and
   an adapter manager interfaced with the power manager and the over current protection circuit, the adapter manager operable to set the over current protection circuit at the low power level if no identification information is provided by the power manager and to receive the identification information from the power manager and to apply the identification information to set the over current protection circuit to a selected of either the high power level or the low power level.

2. The information handling system of claim 1 wherein the high level comprises greater than 240 Watts.

3. The information handling system of claim 1 wherein the adapter manager is further operable to maintain the low power level if the power adapter lacks an interface with the information handling system.

4. The information handling system of claim 1 wherein the identification information to set the high power level comprises a low signal pulse signal.

5. The information handling system of claim 1 wherein the identification information comprises a pulsed signal.

6. The information handling system of claim 5 wherein the adapter manager is further operable to distinguish the low signal pulse from serial communication signals.

7. A method for powering an information handling system with an AC-to-DC adapter, the method comprising:
    configuring the AC-to-DC adapter to couple to plural types of information handling systems, each type having a power level;
    coupling the AC-to-DC adapter to an information handling system by an external power cord;
    setting the AC-to-DC adapter to output up to a first power level;
    receiving at the AC-to-DC adapter identification information sent from a power manager of the information handling system through the external power cord to an adapter manager of the AC-to-DC adapter interfaced with the power manager;
    determining at the AC-to-DC adapter manager that the identification information authorizes output at a second power level that is greater than the first power level; and
    in response to the determining, setting the AC-to-DC adapter to a selected of either the first power level or the second power level.

8. The method of claim 7 wherein the first power level is associated with powering a first class of information handling systems and the second power level is associated with powering a second class of information handling system.

9. The method of claim 8 wherein the second power level comprises greater than 240 Watts.

10. The method of claim 7 further comprising:
    requiring a connection between an information handling system and the AC-to-DC adapter before setting the AC-to-DC adapter to output up to the second power level.

11. The method of claim 7 wherein setting the AC-to-DC adapter to output up to the second power level further comprises increasing the setpoint of an over current protection circuit from the first power level to the second power level.

12. The method of claim 7 wherein the identification information to authorize power at the second power level comprises a low signal pulse signal.

13. The method of claim 12 wherein the identification information comprises the low signal pulse sent across a serial communication link.

14. The method of claim 7 further comprising:
    detecting at the AC-to-DC adapter a disconnection from the information handling system; and
    in response to the detecting, setting the AC-to-DC adapter to output up to the first power level.

15. A system for managing power output from an AC-to-DC adapter, the system comprising:
    a DC cable operable to couple between the AC-to-DC adapter and plural types of devices, each type having a power level;
    an over current protection circuit operable to allow output of up to a first power level or up to a second power level;
    an identification module operable to receive an identification signal from a device through the DC cable that identifies a device receiving power from the AC-to-DC adapter as a first device type associated with the first power level or a second device type associated with the second power level; and
    an adapter manager interfaced with the over current protection circuit and operable to set the over current protection circuit to a first setpoint associated with the first device type unless the identification signal indicates the second device type, the adapter manager further operable to set the over current protection circuit to a selected of either the first or a second setpoint associated with the second device type if the identification signal indicates the second device type.

16. The system of claim 15 wherein the first device type comprises an information handling system having power consumption associated with the first setpoint and the second device type comprises an information handling system having power consumption associated with the second setpoint.

17. The system of claim 15 wherein the adapter manager is further operable to set the over current protection as the first setpoint upon initial application of power from an external power source.

18. The system of claim 15 wherein the adapter manager is further operable to set the over current protection as the first set point upon initial connection with an information handling system.

19. The system of claim 18 wherein the identification signal comprises a low signal pulse communicated from the device receiving power across a serial communication link.

20. The system of claim 19 further comprising a timer interfaced with the serial link and operable to distinguish the continuing signal from serial communications of the serial link.

* * * * *